(12) United States Patent
Loviat et al.

(10) Patent No.: US 9,663,616 B2
(45) Date of Patent: May 30, 2017

(54) METHOD FOR MANUFACTURING POLY(2-HYDROXYALKANOIC ACID), AND THE POLY(2-HYDROXYALKANOIC ACID) OBTAINABLE THEREBY

(71) Applicants: Sulzer Chemtech AG, Winterthur (CH); Purac Biochem BV, AC Gorinchem (NL)

(72) Inventors: François Loviat, Sennhof (CH); Liborio Ivano Costa, Winterthur (CH)

(73) Assignees: Sulzer Chemtech AG, Winterthur (CH); Purac Biochem BV, AC Gorinchem (NL)

( * ) Notice: Subject to any disclaimer, the term of this patent is extended or adjusted under 35 U.S.C. 154(b) by 0 days.

(21) Appl. No.: 14/907,910

(22) PCT Filed: Feb. 11, 2014

(86) PCT No.: PCT/EP2014/052676
§ 371 (c)(1),
(2) Date: Jan. 27, 2016

(87) PCT Pub. No.: WO2015/014502
PCT Pub. Date: Feb. 5, 2015

(65) Prior Publication Data
US 2016/0159977 A1    Jun. 9, 2016

(30) Foreign Application Priority Data
Jul. 30, 2013   (EP) ..................... 13178531

(51) Int. Cl.
*C08G 63/02* (2006.01)
*C08G 63/82* (2006.01)
*C08G 63/08* (2006.01)
*C08G 63/78* (2006.01)
*C08G 63/91* (2006.01)

(52) U.S. Cl.
CPC ........... *C08G 63/823* (2013.01); *C08G 63/08* (2013.01); *C08G 63/78* (2013.01); *C08G 63/912* (2013.01)

(58) Field of Classification Search
CPC .................................................. C08G 63/823
USPC ................................ 528/281, 282, 283, 284
See application file for complete search history.

(56) References Cited

U.S. PATENT DOCUMENTS

| 5,770,682 A | 6/1998 | Ohara et al. |
| 6,353,086 B1 | 3/2002 | Kolstad et al. |
| 6,559,244 B1 | 5/2003 | Sodergard et al. |
| 8,318,837 B2 | 11/2012 | Sato et al. |
| 2004/0143072 A1* | 7/2004 | Lewis .................... C08G 63/06 525/417 |

FOREIGN PATENT DOCUMENTS

| CN | 102634001 A | 8/2012 |
| EP | 1867680 A1 | 12/2007 |
| EP | 2271696 B1 | 3/2012 |
| JP | 62135521 | 6/1987 |
| WO | 2009121830 A1 | 10/2009 |
| WO | 2010012770 A1 | 2/2010 |

* cited by examiner

*Primary Examiner* — Terressa Boykin
(74) *Attorney, Agent, or Firm* — Larson & Anderson, LLC

(57) ABSTRACT

A method for manufacturing poly(2-hydroxyalkanoic acid), preferably a poly(lactic acid), is disclosed. The method comprises the steps of: mixing a cyclic diester of a 2-hydroxyalkanoic acid and a polymerization catalyst, polymerizing the cyclic diester to form poly(2-hydroxyalkanoic acid) in liquid phase, adding a peroxide-based compound as a catalyst deactivating agent to the liquid phase, applying a devolatilization step to the liquid phase, and allowing the poly(2-hydroxyalkanoic acid) to solidify, characterized in that an end-capping agent is added to the poly(2-hydroxyalkanoic acid) in the liquid phase. The present invention also relates to a poly(2-hydroxyalkanoic acid), preferably a poly(lactic acid), obtainable with said method characterized in that the polymer has a Mn abs ranging between 10000 and 250000 g/mol, preferably between 20000 and 85000 g/mol.

21 Claims, 5 Drawing Sheets

Table 1.  Gas Chromatography Instrument settings: Parameters of lactide residue determination method

| Parameters | Settings |
|---|---|
| Oven Temperature | 50 °C – 3min |
|  | 20 °C/min to 150 °C – 0min |
|  | 45 °C/min to 320 °C – 1min |
| Detector | FID |
| Injector Temperature | 180 °C |
| Detector Temperature | 350 °C |
| Carrier Gas Rate | 1mL/min, constant flow |
| Detector range | 1 |
| Injection volume | 1µL |
| Fuel Gas (H2) | 45 mL/min |
| Injection mode | Split |
| Fuel Gas (Air) | 450 mL/min |
| Split Ratio | 10 |
| Attenuation | –6 |
| Liner | Wide bore with silanized glass wool |

Fig. 3

Table 2. Pilot plant trials: working and comparative examples

| Trial | Example | Agent added | Agent added at 7 [wt/wt%] | Agent added at 8 [wt/wt%] | Residual lactide measured at 12 [wt/wt%] | Anhydride/Endgroups [mol/mol] |
|---|---|---|---|---|---|---|
| 1 | CE1 | TMBH only (7 and 8) | 0.15 | 0.15 | 1.5 ± 0.4 | 0 |
| 2 | | Anhydride only | | | | |
| | CE2 | SA (7) | 0.19 | | 1.3 | 0.96 |
| | CE3 | SA (7) | 0.41 | | 1.3 | 2.04 |
| | CE4 | SA (7) | 0.60 | | 1.3 | 3.00 |
| 3 | WE1 | Succinic Anhydride (7) + TMBH (8) | 0.24 | 0.15 | 0.23 ± 0.06 | 1.60 |
| | WE2 | Acetic Anhydride (7) + TMBH (8) | 0.22 | 0.15 | 0.18 | 1.40 |
| | WE3 | Phthalic Anhydride (7) + TMBH (8) | 0.26 | 0.15 | 0.25 ± 0.02 | 1.19 |

Fig. 4

Table 3. Model laboratory experiments: working and comparative examples

| Trial | Example | Agent added | Acetic Anhydride [wt/wt%] | Peroxide [wt/wt%] | Conversion [wt/wt%] |
|---|---|---|---|---|---|
| 4 | CE5 | TMBH | - | 1.5 | 91±2.0 |
| 4 | WE4 | Acetic Anhydride + TMBH | 1.8 | 1.5 | 78.5±2.5 |
| 4 | CE6 | None | - | - | 96±0.0 |

Fig.5

METHOD FOR MANUFACTURING POLY(2-HYDROXYALKANOIC ACID), AND THE POLY(2-HYDROXYALKANOIC ACID) OBTAINABLE THEREBY

BACKGROUND OF THE INVENTION

The present invention relates to a method for manufacturing poly(2-hydroxyalkanoic acid), preferably a poly(lactic acid). The present invention also relates to a poly(2-hydroxyalkanoic acid), preferably a poly(lactic acid), obtainable by said method.

Poly(2-hydroxyalkanoic) acids constitute a class of polymer compounds which currently receive much interest. Examples of such polymers compounds are polyglycolide, poly(ε-caprolactone) and poly(hydroxybutyrate) as well as their copolymers. Nowadays, most attention however is devoted to polylactide, which is also referred to as polylactic acid and abbreviated as PLA. This polymer is an aliphatic polyester, which can be manufactured from renewable resources. This manufacturing involves the fermentation of starch or sugar into lactic acid. PLA is usually synthesized either by direct polycondensation of lactic acid (lactate monomers), or by ring-opening polymerization (ROP) of lactide (cyclic lactate dimers). High molecular weight polymers are usually produced by means of the second method using lactide. Such lactides are most often obtained by depolymerization of PLA oligomers as a result of ring-closures reactions in the presence of a suitable catalyst. After purification, the lactide can be polymerized into PLA of controlled molecular weight by means of a ring-opening polymerization reaction.

Several methods of manufacturing PLA by ROP of lactide, as mentioned in the opening paragraph, are known as such. In one example, WO2010/012770 (A1), a polylactic acid (PLA) was prepared by the melt polymerization of L-lactide in a continuous pilot-scale polymerization reactor. The process was carried out at a temperature between 100-240° C. which comprises the steps of: a) continuously providing cyclic ester monomer and polymerisation catalyst to a continuous mixing reactor, the reactor being operated at conditions effective for polymerisation to form a pre-polymerised reaction mixture, b) continuously removing pre-polymerised reaction mixture from the continuous mixing reactor and continuously providing pre-polymerised reaction mixture to a plug flow reactor, the plug flow reactor being operated under polymerisation conditions, wherein the reaction mixture is polymerised to a degree of polymerisation of at least 90%, to form polymer c) continuously removing polymer from the plug flow reactor. Residual lactide content in the PLLA was reported to be 4-5% if the plug flow reactor was operated at a temperature of approx. 190° C. However for commercial purposes it would be desirable to produce a PLA having much lower levels of residual lactide content, e.g. of less than at least 0.5%.

U.S. Pat. No. 5,770,682 discloses a method for producing a PLA, comprising the steps of carrying out a ring-opening polymerization of lactide to give polylactic acid, adding a compound capable of inactivating a catalyst for ring-opening polymerization of the lactide at the completion of the reaction, and removing unchanged lactide from the polylactic acid product by reducing pressure and/or allowing an inert gas to pass. US '682 discloses the use of phosphorus-based acids or their esters, aluminum compounds, or oxidizing agents as compounds capable of inactivating catalysts. However it is often undesirable to use free acidic compounds or compounds that may decompose to yield acidic species in high temperature polymerization production processes due to the risk of corrosion of the apparatus and also subsequent leaching of metallic species into the polymer. It is also generally desirable to limit the incorporation of metallic species into thermoplastics as they may limit the melt stability or cause degradation and/or discoloration upon subsequent melt fabrication into finished articles. Furthermore, the level of residual lactide in the PLA polymers was not reported in US '682 for the examples prepared by this method.

As another example, the patent document EP 2 271 696 B1 discloses a process for manufacturing PLA comprising the steps of combining lactide with a polymerisation catalyst, subjecting the mixture to polymerization conditions to form polylactide in the liquid state, adding an organic peroxide, subjecting the liquid polylactide to a devolatilisation step, and allowing the polylactide to solidify. EP '696 B1 discloses examples of using a peroxide, hydroperoxide, in stabilizing a polylactic acid (PLA) prepared by the melt polymerization of L-lactide in a similar continuous pilot-scale polymerization reactor. The melt stability of a PLA having 7% residual lactide was improved by the post-polymerization addition of hydroperoxide in the examples. However for commercial purposes it would be desirable to produce a PLA having much lower levels of residual lactide content, e.g. of less than at least 0.5%.

In Applicant's view, these known methods can be improved, particularly because it was found that the residual lactide level of the formed PLA in the known processes is not optimal. More precisely it has been shown that after the devolatilisation step an appreciable amount of lactide is reformed from the PLA in the liquid phase, via a process which is called 'back-biting'. This process is disadvantageous with respect to the PLA end product. Firstly, it reduces the MW of the manufactured PLA after the devolatilisation step. Secondly, it increases also the lactide concentration in the ultimate PLA product, which increase is not desired because of the plasticizing effect of lactide as well as possible deposit of lactide on processing equipment.

In conclusion, it would be desirable to have a method to manufacture poly(2-hydroxyalkanoic acid), particularly PLA, by ROP in which the resulting PLA product contains a reduced amount of lactide and has improved melt stability against "back-biting".

SUMMARY OF THE INVENTION

Starting from this state of the art, it is an object of the invention to provide a method for manufacturing poly(2-hydroxyalkanoic acid), that does not suffer from the previous mentioned deficiencies, particularly a high amount of lactide and a susceptibility to "back-biting" in the polymer product. Further objects of the invention include providing a poly(2-hydroxyalkanoic acid) obtainable by said method having reduced lactide content and improved stability against "back-biting".

According to the invention, these objects are achieved by a method for manufacturing poly(2-hydroxyalkanoic acid), preferably a poly(lactic acid), comprising the steps of:

mixing a cyclic diester of a 2-hydroxyalkanoic acid and a polymerization catalyst, polymerizing the cyclic diester to form poly(2-hydroxyalkanoic acid) in liquid phase, adding a peroxide-based compound as a catalyst deactivating agent to the liquid phase, applying a devolatilisation step to the liquid phase, and allowing the poly(2-hydroxyalkanoic acid) to solidify, wherein an end-capping agent is added to the poly(2-hydroxyalkanoic acid) in the liquid phase.

The other further object to provide a poly(2-hydroxyalkanoic acid) having reduced lactide content and improved stability against "back-biting" is achieved by a poly(2-hydroxyalkanoic acid), preferably a poly(lactic acid), obtainable with the above-described method, wherein the polymer has a Mn abs ranging between 10000 and 250000 g/mol, preferably between 20000 and 85000 g/mol.

The present invention achieves these objects and provides a solution to this problem by means of an end-capping agent which is added to the poly(2-hydroxyalkanoic acid) in the liquid phase.

These results surprisingly make possible a reduction in the amount of the cyclic diester, lactide, in the polymer product. Without wishing to be bound by a particular mechanism, the inventor believe that the end-capping agent reduces the susceptibility to "back-biting" in the polymer product, which then reduces the tendency to depolymerise and release cyclic diester.

The inventors have found that adding adding an end-capping agent to the poly(2-hydroxyalkanoic acid) in the liquid phase improves the known polymerization process (WO2010/012770) It has been observed that the amount of cyclic diester in the polymerized end product is less than that obtained with the known process, in which no end-capping agent is added. Furthermore the decrease of the molecular weight of the produced polymer after the devolatilization step is significantly reduced in the method of the invention. It is noted that the method according to the invention functions optimally if the concentrations of cyclic diester and its corresponding polymer are at thermodynamic equilibrium in the liquid phase just before the devolatilisation step. It is also noted that the deactivating agent is added to and mixed with the liquid phase before the polymer in said phase is solidified.

In one embodiment of the method, the end-capping agent is an anhydride, preferably in the absence of a solvent. As will be shown later by means of the examples, anhydrides have been found to be effective endcappers when used together with peroxide. Liquid anhydrides such as acetic anhydride are preferably added neat without solvent, so that no solvent removal is required and thus there is no need to recycle/recover solvents, which makes the overall process "greener" and more environmentally friendly. In addition, there is beneficially no contamination of either the polymer product or overhead streams etc. by solvents and their byproducts. It is noted that solid anhydrides such as succinic or phthalic anhydrides are thus preferably added as melts so as to avoid the need for solvents and their subsequent removal.

According to another more specific embodiment of the method, the anhydride is one selected from the group consisting of phthalic anhydride, acetic anhydride, succinic anhydride and their mixtures, preferably succinic anhydride. As will be shown later by means of the examples, these anhydrides have been demonstrated to be particularly effective in the method of the invention, and they are also readily commercially available for use in chemical processes. It is noted that acetic anhydride may be less preferred because it may yield acetic acid as a volatile byproduct which may then contaminate overhead streams. Phthalic anhydride may be less preferred than succinic anhydride because it has a higher melting point and thus requires higher temperatures/ more energy for its use and addition in the method. Furthermore phthalic anhydride may be less EHS-friendly than succinic anhydride due to its higher health hazard rating in the Hazardous Materials Identification System.

According to another embodiment of the method, the peroxide-based compound is an organic peroxide, organic hydroperoxides, or perester. Such peroxide-based compounds have been found to be effective in the method of the invention.

According to a more specific embodiment of the method, the peroxide-based compound is selected from 1,1,3,3-tetramethylbutylhydroperoxide, benzoyl peroxide, dilauroyl peroxide, tert-butylperoxy-diethylacetate, tert-butylperoxy-2-ethyl hexanoate, tert-butylperoxy-isobutyrate, tert-butylperoxy-acetate, tert-butylperoxy-benzoate, dibenzoyl peroxide, and their mixtures, preferably 1,1,3,3-tetramethylbutylhydroperoxide. These compounds are generally readily available on a commercial scale, approved for use in industrial processes, and conveniently handled in polymerization plants and processes.

In yet another embodiment of the method, the cyclic diester is lactide, the polymerization catalyst is a tin-based catalyst, preferably tin(II) 2-ethylhexanoate, preferably in combination with an alcoholic cocatalyst, preferably hexanol or 2-ethyl-1-hexanol. These compounds are also generally readily available on a commercial scale, approved for use in industrial processes, and conveniently handled in polymerization plants and processes. As will be shown later by means of the examples, such raw materials have been found to be effective when used in the method of the invention.

According to yet a further embodiment of the method, the amount of added end-capping agent to the poly(2-hydroxyalkanoic acid) in the liquid phase is in the range between 0.1 and 4, preferably 0.5 and 2, molar excess as compared to the amount of end groups of the poly(2-hydroxyalkanoic acid) in the liquid phase. The use of such amounts has been found to provide polymer products with low amounts of residual cyclic diester, and it is cost-effective and beneficial for the final polymer product properties to avoid adding more agent than necessary. In the present application, the amount of end groups is defined to be equal to the amount of alcoholic cocatalyst used. For embodiments of the method in which no alcoholic catalyst is added, the amount of end groups is defined as the inverse Mn abs of the polymer in the liquid phase as determined by SEC measurements using triple detection methods. Such SEC measurements making use of triple detection methods to determine an Mn absolute are described in handbooks, for example, in Modern Size-exclusion Liquid Chromatography: Practice of Gel Permeation and Gel Filtration Chromatography, by A. Striegel, W. W. Yau, J. J. Kirkland, and D. D. Bly, published in 2009 by John Wiley and Sons, Hoboken, N.J. (ISBN-13: 978-0470442838).

In yet another embodiment of the method, the end-capping agent and the catalyst deactivating agent are added to the poly(2-hydroxyalkanoic acid) in the liquid phase at different stages of the polymerization process. In the present invention, a different stage refers to a different point in the progress of the method, for example, a different point of addition in continuous production methods. Addition of agents at different stages minimizes the risk of reaction of agents together, for example, in dosing systems, which may decrease their effectiveness. Furthermore adding the agents independently allows their levels to be controlled independently and allows each agent to carry out its targeted activity, e.g. catalyst deactivation and end-capping, without risk of interference by the other agent or its targeted activity.

According to still yet a further other embodiment of the method, the end-capping agent is added prior to the deactivating agent, preferably prior to the devolatilization step, and the deactivating agent is preferably added after the devolatilization step. As will be shown later by means of the examples, this addition sequence has been demonstrated to be effective in the method of the invention. Without wishing to be bound by any particular mechanism, the inventors consider that it might be potentially beneficial to have active catalyst present during the end-capping step. Furthermore carrying out the end-capping step prior to the devolatilization step may beneficially prevent the occurrence of backbiting or re-equilibration between monomer and polymer during and/or after the devolatilization step, in which monomer is devolatilized. Adding the deactivating agent after devolatilization may avoid devolatilization of the deactivating agent before it can deactivate the catalyst.

According to still yet a further embodiment of the method, an additional devolatilization step is applied on the formed poly(2-hydroxyalkanoic acid) in the liquid phase after the addition of the deactivating agent. Such an additional devolatilization step has been found to be useful in allowing particularly low levels of residual cyclic diester to be obtained.

According to one embodiment of the poly(2-hydroxyalkanoic acid) according to the invention, the concentration of cyclic diester in the corresponding polymer is less than 0.5% by weight, and preferably less than 0.3%. As will be shown later by means of the examples, the obtainment of such beneficial low levels of residual cyclic diester has been demonstrated to be readily obtainable in the method of the invention. The measurement of residual lactide concentrations in PLA matrices by means of NMR or infrared spectroscopies has been disclosed by B. Braun, J. R. Dorgan, and S. F. Dec in Macromolecules, 2006, 39 (26), pp 9302-9310. In the present application, the concentration of cyclic diester in the corresponding polymer is defined as the concentration as measured by GC, preferably using the method as described in the examples.

According to another embodiment of the poly(2-hydroxyalkanoic acid) according to the invention, a portion of the end groups are derived from an anhydride, preferably succinic or phthalic anhydride, most preferably succinic anhydride. The benefits of using such anhydrides as end-capping agents have been described earlier, and their beneficial use results in their subsequent incorporation as end groups to the polymer product.

According to yet another embodiment of the poly(2-hydroxyalkanoic acid) according to the invention, a portion of the end groups are carboxylic acid end groups, preferably carboxylic acid end groups comprising —O—(C=O)R (C=O)—OH, wherein R is a $C_1$ to $C_8$ alkyl. Such carboxylic end groups will result from the use of the preferred anhydride end-capping agents.

According to still yet another embodiment of the poly(2-hydroxyalkanoic acid) according to the invention, the poly(2-hydroxyalkanoic acid) polymer contains a residue of a tin-based catalyst and a residue of 1,1,3,3-tetramethylbutylhydroperoxide. As will be shown later by means of the examples, the use of tin-based catalysts such as tin-octoate together with 1,1,3,3-tetramethylbutylhydroperoxide as the catalyst deactivating agent have been found to be particularly effective in the method of the invention. The beneficial use of such catalysts and agents will typically result in their detectable residues being present in the polymer product. For example, it is disclosed in Biomacromolecules 2011 12 (3), 523-532, that residual tin content in PLA may be measured by energy-dispersive X-ray spectrometry, ICP, or atomic absorption flame emission spectrometry. According to NMR Spectroscopy of Polymers, Series: Springer Laboratory, by Kitayama, Tatsuki and Hatada, Koichi, 2004, XII, published in 2004 by Springer, Berlin, Germany (ISBN 978-3-540-40220-6), the t-butyl end group is a favourable end group for observation since it consists of three equivalent end groups which then show a sharp singlet in the NMR spectrum.

One skilled in the art will understand that the combination of the subject matters of the various claims and embodiments of the invention is possible without limitation in the invention to the extent that such combinations are technically feasible. In this combination, the subject matter of any one claim may be combined with the subject matter of one or more of the other claims. In this combination of subject matters, the subject matter of any one method claim may be combined with the subject matter of one or more other method claims or the subject matter of one or more polymer claims or the subject matter of a mixture of one or more method claims and polymer claims. By analogy, the subject matter of any one polymer claim may be combined with the subject matter of one or more other polymer claims or the subject matter of one or more method claims or the subject matter of a mixture of one or more polymer claims and method claims. By way of example, the subject matter of any one claim may be combined with the subject matters of any number of the other claims without limitation to the extent that such combinations are technically feasible.

One skilled in the art will understand that the combination of the subject matters of the various embodiments of the invention is possible without limitation in the invention. For example, the subject matter of one of the above-mentioned method embodiments may be combined with the subject matter of one or more of the other above-mentioned polymer embodiments or vice versa without limitation so long as technically feasible.

BRIEF DESCRIPTION OF THE DRAWINGS

The invention will be explained in more detail hereinafter with reference to various embodiments of the invention as well as to the drawings. The schematic drawings show:

FIG. 3 shows a table (Table 1) of instrumental settings for the measurement of residual lactide in PLA polymers performed in the course of the present invention by gas chromatography FIG. 4 shows a second table (Table 2) depicting data of a series of experiments performed in the course of the present invention in a pilot plant trials.

FIG. 5 shows a third table (Table 3) depicting data of a second series of experiments performed in the course of the present invention in model laboratory trials

DETAILED DESCRIPTION OF THE INVENTION

Definitions

As used in the specification and claims of this application, the following definitions, should be applied:

"a", "an", and "the" as an antecedent refer to either the singular or plural. For example, "a peroxide-based compound" refers to either a single species of compound or a mixture of such species unless the context indicates otherwise.

A "lactide" may refer to any one of three different isomeric structures such as R,R-lactide (or D-lactide), S,S-lactide (or L-lactide) and R,S-lactide (or meso-lactide) or their mixtures.

It is observed that in a batch polymerization process, the expression 'different stages of the polymerization process' refers to a different moment in time. However, in a continuous process, the expression 'different stages of the polymerization process' refers to different positions of the polymerization apparatus along which the liquid phase flow of the reacting mixture is guided.

Numerical values in the present application relate to average values. Furthermore, unless indicated to the contrary, the numerical values should be understood to include numerical values which are the same when reduced to the same number of significant figures and numerical values that differ from the stated value by less than the experimental error of the conventional measurement technique of the type described in the present application to determine the value.

It is noted that methods of analysis of PLA polymers, such as their molecular weight properties, spectroscopic properties, end groups, and residual species are well-known in the art, for example, as disclosed in Biopolymers: New Materials for Sustainable Films and Coatings, by D. Plackett, published in 2011 by John Wiley and Sons, West Sussex, UK (ISBN: 9780470683415); Poly(lactic acid): Synthesis, Structures, Properties, Processing, and Applications, edited by R. A. Auras, L.-T. Lim, S. E. M. Selke, and H. Tsuji, and published in 2010 by John Wiley & Sons, Hoboken, N.J., (ISBN: 978-1-118-08813-5), and From Lactic Acid to Poly(lactic acid) (PLA): Characterization and Analysis of PLA and Its Precursors, by S. Inkinen, M. Hakkarainen, A.-C. Albertsson, and A. Södergård, in Biomacromolecules 2011 12 (3), 523-532.

Figure 1:
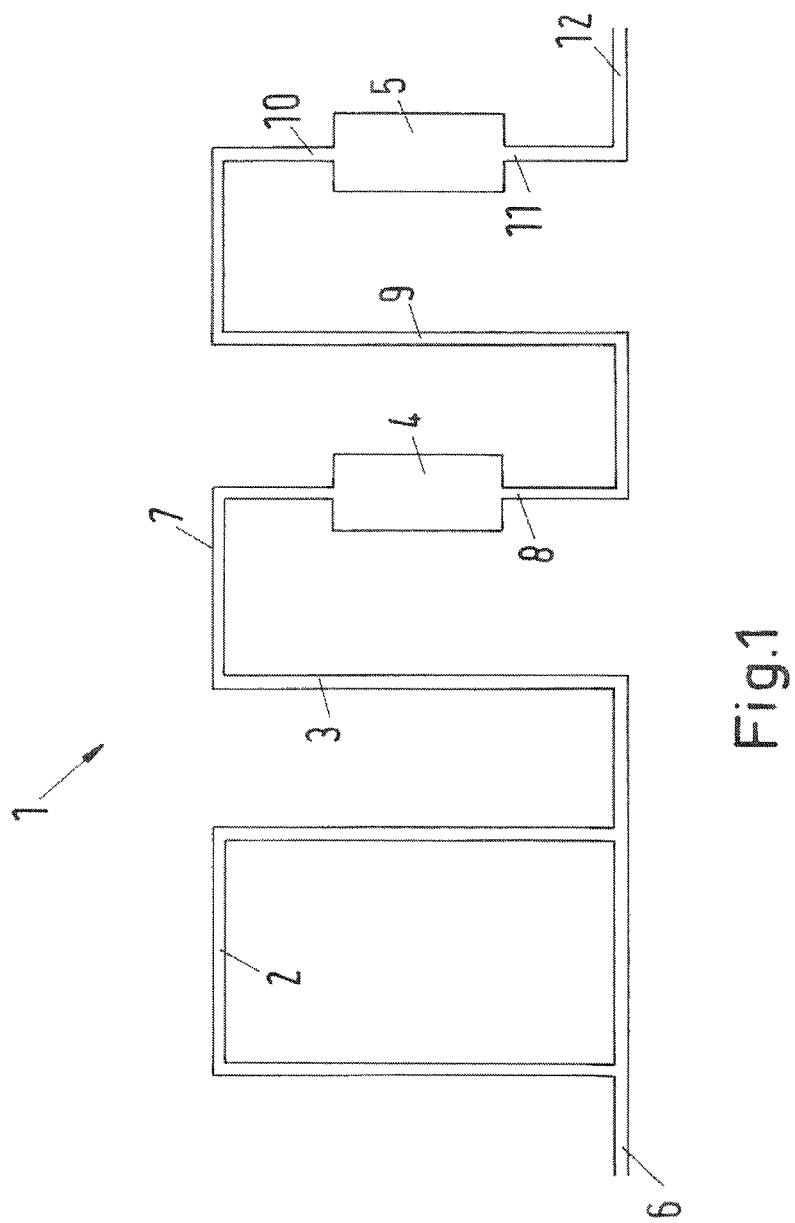
FIG. 1 shows a schematic drawing (not to scale) of an apparatus for performing the method according to the present invention for manufacturing poly(2-hydroxyalkanoic acid) from the corresponding cyclic diester.

In FIG. 1 a polymerization apparatus 1 is depicted, which comprises a loop reactor 2, a plug flow reactor 3 and a two-stage vacuum devolatilisation unit, containing devolatilisation tanks 4 and 5. A polymerization apparatus of this type has been described in more detail in the international patent application with publication number WO2010/012770-A1, filed in the name of the present applicants.

The cyclic diester of a 2-hydroxyalkanoic acid of which a polymer needs to be manufactured and a polymerization catalyst are mixed in molten form and added at position 6 in the polymerization apparatus. The temperature of the mixture is chosen such that the mixture remains in liquid form. If alcoholic functionalities need to be added, they can be introduced in the system at the same position, for example as alcohols. The mixture is transported in a continuous way to and circulated in the loop reactor 2. Part of the partially polymerized mixture is separated from the loop reactor 2 and transported in a continuous manner through the plug flow reactor 3. Reaction conditions (temperature, flow speed, catalyst concentration, etc) are chosen such that the conversion of the cyclic diester in the reaction mixture is (almost) complete and at equilibrium with the corresponding polymer at the end of plug flow reactor 3.

At position 7 (at the end of plug flow reaction 3 and before devolatilisation tank 4), a sampling and/or injection port allows the injection of an end-capping agent or a catalyst deactivating agent. At position 8 (after devolatilisation tank 4) a second sampling point is available for the same purpose. Additional sampling and/or injection ports have been designed in the apparatus at position 9 (in the middle of the connection line between both devolatilisation tanks 4 and 5), at position 10 (just before the second devolatilisation tank 5) and at positions 11 (just after the second devolatilisation tank 5). At all sampling and/or injection ports as well as at the end of the polymerization apparatus it is possible to collect small amounts from the flowing polymerization mixture for analysis purposes. These samples can be quenched and their content measured to quantify the cyclic diester content, the end-capper content, the catalyst content and the catalyst deactivating agent content.

In order to verify the effectiveness of the catalyst deactivation on the melt stability of the reaction mixture, the following criteria have been adopted. The result of an experiment is considered positive if the residual monomer content of the polymer product at the end of the process (position 12) is less than 0.5% by weight (w/w). Otherwise, the result is considered negative. For all positive results, the catalyst deactivation process is considered more efficient, the lower the increase in residual monomer through the line connecting the devolatilization tanks 4 and 5 (transfer line). The increase in residual monomer through the transfer line can be measured as the difference in residual monomer between samples taken in position 10 and in position 9 or between samples taken in position 10 and 8.

Figure 2:
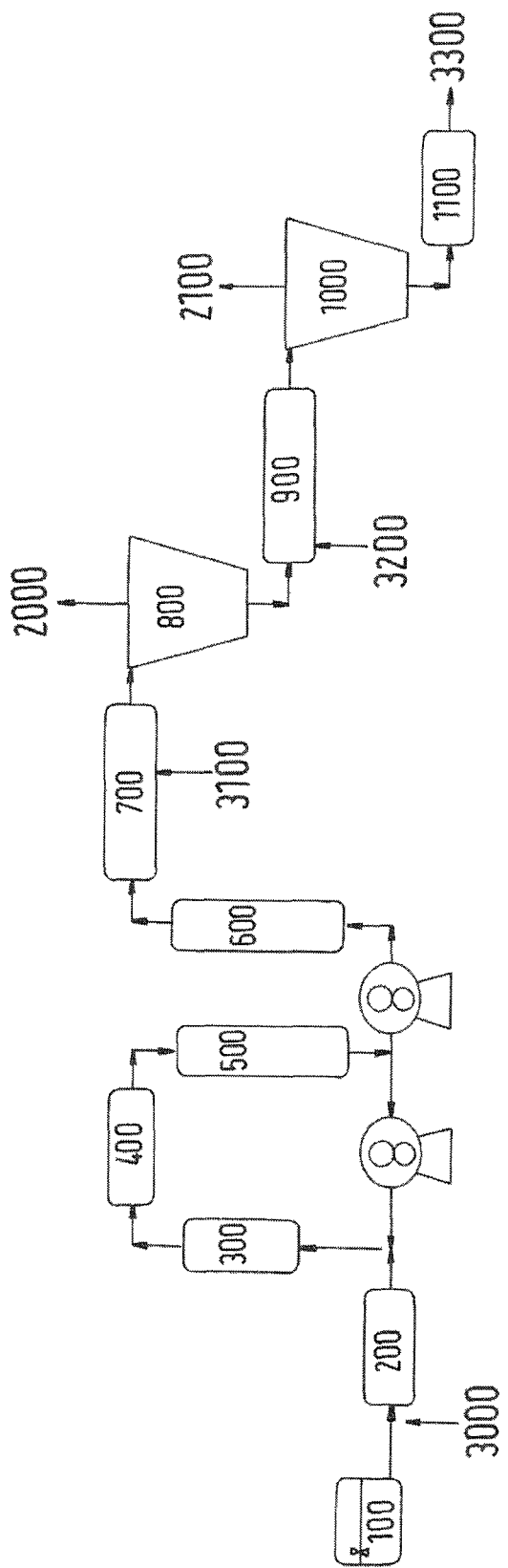
FIG. 2 shows a schematic drawing (not to scale) of an alternative apparatus for performing the method according to the present invention

FIG. 2 shows another embodiment of a polymerization apparatus suitable for carrying out the invention. Monomer tank 100 contains a cyclic diester of a 2-hydroxyalkanoic acid under inert atmosphere. At position 3000 the polymerization catalyst and optional alcoholic functionalities may be added.

Next the cyclic diester monomer and other components enter a loop reactor comprising static mixer units 300 and 400 and heat exchanger unit 500. It is noted that the components may enter the loop reactor by means of an optional static mixer unit 200. One skilled in the art will understand that each of the units 200 to 500 may comprise one or more subunits.

A polymerized mixture with a monomer conversion ranging from 25 to 85% by weight, more preferably ranging from 40 to 75%, exits the loop reactor and enters unit 600, which may comprise one or more static mixer or heat exchanger subunits or their combinations. The polymerized mixture next enters unit 700, which may comprise one or more static mixer or heat exchanger subunits or their combinations. The polymerized mixture with a monomer conversion higher than 75% by weight next enters a first devolatilization unit 800, in which unreacted monomer is removed by means of vacuum and/or an inert gas stream. One skilled in the art will understand that unit 800 may comprise one or more subunits. The first devolatilized polymerized mixture next enters optional unit 900, which may comprise one or more static mixer or heat exchanger subunits or their combinations. The first devolatilized polymerized mixture next enters optional second devolatilization unit 1000, which may comprise one or more subunits. Finally the polymer product enters finishing device 1100 which may by a pelletizer, extruder, or other product finishing device, and exits the system as product 3300, which may be in the form of pellets, granulates, or finished product.

It is noted that in this embodiment the devolatilized cyclic diester monomer is removed from the polymerized mixture as part of streams 2000 and 2100. Typically somewhat elevated pressures may be present in units 200 to 700, as well as 900 and 1100. Typically, low pressures may be present in units 800 and 1000, such pressures will often be less than 50, preferably less than 20 mbar, more preferably less than 10 mbar. Typical temperature ranges for units 100 to 200 will be from 80 to 200° C., and typical temperature ranges for units 300 to 1100 will be from 150 to 250° C.

A catalyst deactivating agent and/or an end-capping agent may be added in this embodiment at positions 3100 and/or 3200.

As noted earlier, the cyclic diester of a 2-hydroxyalkanoic acid, the polymerization catalyst, peroxide-based compound, and the end-capping agent may each be a single chemical species or a mixture of one or more chemical species. For example, mixtures of equal amounts of D- and L-lactide are often referred to as racemic lactide or rac-lactide. Within the scope of the present invention, both the three pure lactides (being composed of only one diastereomer) as well as mixtures of two or more of the pure lactides can be used. The lactide can be added in liquid form directly after its production and purification, e.g. from a depolymerized prepolymer of lactic acid. The lactide can also be added from storage where it is kept in solid form, like a powder or flakes.

It is noted that the polymerization in principle may be performed in solution or in melt, of which melt polymerization is preferred due to lack of need for solvent and solvent recovery.

In the execution of the present invention, any catalyst which is able to polymerize a cyclic diester into its corresponding polymeric form can be used as long as it can be inactivated by a peroxide-based compound. Suitable catalysts for use in the present invention are those well-known in the art for polymerization of cyclic diesters, such as metal coordination compounds comprising a metal ion having more than one stable oxidation state. Of this class of catalysts, the tin-containing compounds are preferred, of which tin-octoate is the most preferred catalyst. The catalyst concentration is generally at least 5 ppm, calculated as metal weight, more in particular at least 10 ppm. Where larger than conventional amounts are used, the catalyst, concentration is at least 30 ppm, more in particular at least 50 ppm. The catalyst concentration is generally at most 200 ppm, in particular at most 150 ppm. In some embodiments, alcoholic cocatalysts are used, which beneficially also allow a control on Mn to be made. The co-catalyst is generally used in an amount of the same order as the amount of catalyst, e.g., in a molar ratio of catalyst to co-catalyst of 50:1 to 1:50. The cyclic diester may be in solid phase when mixing it with the catalyst. However, bringing the cyclic diester into molten phase and adding the catalyst afterwards is preferred.

When the devolatilisation step is performed, a reduced partial pressure is applied to the melt. This can be achieved by means of applying a vacuum and/or a purge stream of for example nitrogen gas.

The amount of catalyst deactivating agent to be added typically ranges from 0.002-0.4 weight percent relative to the total weight of the process stream. If less than 0.002 weight percent is added, the deactivating reaction cannot proceed to completion. If more than 0.4 weight percent is added, no additional deactivating effect is noted. So, adding more than 0.4 weight percent leads to wasting of the catalyst deactivating agent and unnecessary pollution of the resulting polymer product. Therefore, to avoid both disadvantages as much as possible, it is preferred to use an amount of catalyst deactivating agent ranging between 0.02 and 0.4 weight percent. Most preferred is an added amount of catalyst deactivating agent of approximately 0.1 weight percent relative to the total weight of the process stream.

Much attention has been devoted to the aspect of the present invention in which an end-capping agent is added to the poly(2-hydroxyalkanoic acid) in the liquid phase. The inventors have found that the addition of an end-capping agent significantly improves the reduction in residual cyclic diester (lactide) content of the manufactured poly(2-hydroxyalkanoic acid). This holds especially in case that the polymer is a polylactide. Without being bound to any theory, the inventors believe that said end-capping agent reacts with the hydroxyl-end group of the formed polymer. The presence of these reacted end-capping agents appears to lower the rate of lactide formation caused by depolymerization of the formed polylactide via a so-called 'backbiting' mechanism. Lactide amounts formed in the polymer in liquid phase via this mechanism can become unacceptably large when the polymer is subjected to high temperature treatments, in particular when the treatments are performed at reduced pressures. As the end-capping agent terminates both polymerization and depolymerization, the agent is preferably added at the end of the polymerization of lactide into polylactide, i.e., typically when at least 90%, preferably at least 95 and most preferably at least 97% of the lactide has been converted into polylactide. In practice, this percentage is dictated by the thermodynamic equilibrium at the given temperature of the liquid phase.

It appears that the aimed improvement of the low residual lactide content of the polymer is especially obtained when both the end-capping agent and the catalyst deactivating agent are added to the polymer in liquid phase. Adding only the end-capping agent or only the catalyst deactivating agent did not result in a similar low level of residual lactide in the polylactide polymer produced as compared with the situation in which both agents are added.

In principle, different classes of hydroxyl-binding end-capping agents can be used. A first interesting class of end-capping agents is the class of isocyanates and diisocyanates. Another interesting class of end-capping agents is the class of epoxides and bis-epoxides. Compounds of these classes are in principle suitable for use as end-capping agent in the invented method. A third interesting class of end-capping agents is the anhydrides discussed in detail earlier. Using end-capping agents chosen from the class of anhydrides is advantageous as they show minimal by-products in the reaction with the polymer material. It is further observed that the reactivity of the anhydrides in the presently claimed method is better than the reactivity of (bis)isocyanates and (bis)epoxides. Isocyanate chemistry generally suffers from considerable side-reactions occurring under the used high temperature polymerization conditions, whereas the epoxides react faster with carboxylic acid end groups than with hydroxyl end groups. It is stressed that the class of anhydride compounds includes di- and multi-anhydride compounds as well.

A further interesting embodiment of the invented method is characterized in that the anhydride is phthalic anhydride. Good results are obtained when this compound is used as end-capping agent in the invented method. When this compound is added to the poly(hydroxyalkanoic acid) in liquid phase, the hydroxyl-end group of formed polymer chains is converted into an aromatic carboxylic acid end group.

Another interesting embodiment of the method according to the invention has the feature that the anhydride is acetic anhydride. When this compound is added to the PLA or to another poly(hydroxyalkanoic acid) in liquid phase, the hydroxyl-end group of formed polymer chains is converted into a methyl end group. The use of acetic anhydride as an end-capping agent is preferred over the use of phthalic anhydride. The latter compound has a considerably higher molecular weight as compared with acetic anhydride. So, less material need to be added and mixed with the polymer in liquid phase when using acetic anhydride.

Very special interest exists in the embodiment of the invented method having the feature that the anhydride is succinic anhydride. When this compound is added to the PLA or to another poly(2-hydroxyalkanoic acid) in liquid phase, the hydroxyl-end group of formed polymer chains is converted into an aliphatic carboxylic acid end group. The use of succinic anhydride as end-capping agent is preferred over the use of phthalic anhydride because of the considerably higher molecular weight of the latter anhydride. The preference for the use of succinic anhydride over acetic anhydride is because the former compound does not generate volatile low molecular weight species and the volatility of succinic anhydride itself is relatively low. Volatility of the end-capper can cause problems when the polymer in liquid phase containing such anhydride is subjected to a devolatilisation step. In practice such problems do not occur when succinic anhydride is used as end-capping agent.

An interesting embodiment of the invented method is characterized in that the end-capping agent and the deactivating agent are added to the poly(2-hydroxyalkanoic acid) in the liquid phase at different stages of the polymerization. The inventors believe that this measure largely excludes the possibility that a part of the end-capping agent and the deactivating agent mutually interact and possibly even react. Such interactions and/or reactions could inactivate the working of one or both agents, which is considered to be disadvantageous. So, adding both agents to the formed poly(2-hydroxyalkanoic acid) in liquid phase at different stages of the polymerization process is seen as an effective measure to overcome this drawback. The inventors were able to show that preferably the invented method works better when the end-capping agent is added prior to the deactivating agent. In the course of the present invention, it is preferred that the end-capping agent is added to the reaction mixture before the devolatilisation step is applied whereas the catalyst deactivating agent is added after the devolatilisation step.

Experiments have shown that the added amount of end-capping agent to the poly(2-hydroxyalkanoic acid) in liquid phase preferably is in the range between 0.1 and 4 molar excess to the amount of hydroxyl end groups. If the amount of end-capping agent is smaller than 0.1 molar excess, the increase in the polymer melt stability is insufficient. If, on the other hand, the added amount of end-capping agent is higher than 4 molar excess, no further increase in the polymer melt stability is expected. Such high amounts are therefore only polluting the formed poly(2-hydroxyalkanoic acid) and adding to the total costs of the resin. An optimal compromise between both negative effects is obtained when the amount of end-capping agent is chosen between 0.5 and 2 molar excess, preferably between 0.8 and 1.5 molar excess.

A preferred embodiment of the invented method has the characteristic that an additional devolatilization step is applied on the formed poly(2-hydroxyalkanoic acid) in liquid phase after the addition of the deactivating agent. Remaining diester in the polymer in liquid phase can be removed by means of such a devolatilisation step. The devolatilisation step is performed by means of a lowering of the pressure in the polymer in liquid phase, preferably below 10 mbar. Additionally, it is possible to purge by guiding inert gas through the polymer in liquid phase.

The invention also relates to a poly(2-hydroxyalkanoic acid), which is obtainable with the above-described method. Said polymer is characterized in that it has a Mn absolute ranging between 10000 and 500000, preferably 10000 and 250000, more preferably 20000 and 85000 g/mol as determined by Gel Permeation Chromatography (GPC, also referred to as Size Exclusion Chromatography). Such polymer can answer most requirements posed by the current applications.

Preferred is a poly(2-hydroxyalkanoic acid) obtainable with the method according to the present invention, which is characterized in that the concentration of cyclic diester in the corresponding polymer is less than 0.5% by weight, and preferably less than 0.3%. These amounts of lactide in the polyester polymer can be typically measured using methods like NMR, FT-IR and chromatography-based techniques.

EXAMPLES

The following examples are set forth to provide those of ordinary skill in the art with a detailed description of how the method to manufacture poly(2-hydroxyalkanoic acid) and the poly(2-hydroxyalkanoic acid) obtainable by said method claimed herein are evaluated, and they are not intended to limit the scope of what the inventors regard as their invention.

For the determination of the residual lactide content of the PLA polymers, the PLA sample is typically dissolved in a solvent, preferably chlorinated, the PLA polymer is precipitated using a non solvent, and the resulting clear solution is injected in the GC for analyses. The amounts of sample, solvent and non solvent can be adapted to the required GC sensitivity. Furthermore an internal standard for GC calibration may be added to the solution injected in the GC. In these specific examples, PLA samples and an internal standard were first dissolved in chlorinated solvent and further precipitated in an anti-solvent of PLA, hexane. The residual lactide as well as the internal standard were then extracted from polymer to hexane and the resulting solution was directly injected into GC system. The exact amount of lactide residue can be calculated by applying a suitable calibration of lactide vs. an internal standard using the same GC settings. GC measurements were performed using a GC Clarus 580 gas chromatographer purchased from Perkin Elmer. The instrument consists of an auto-sampler (for direct injection), an injector channel, an oven and a flame ionization detector (FID). The chromatographic columns were J&W DB-17MS GC from Agilent. The instrument settings used are provided in Table 1 in FIG. 3.

In all experiments described below, Puralact lactide (Purac, either D or L) was used as the cyclic diester of 2-hydroxyalkanoic acid. Tin octoate was used as the catalyst. Small amounts of alcohols were added to accelerate the reaction. When used, the commercially available compound 1,1,3,3-tetramethylbutylhydroperoxide (TMBH) was used as a catalyst deactivating agent. When used, acetic anhydride (AA) or succinic anhydride (SA) or phthalic anhydride (PA) were used as end-capping agent in the polymerization reaction.

In a first series of experiments (trial 1), the effect of the catalyst deactivating agent on the polymerization process was investigated in the absence of end-capping agents. In these experiments, Puralact lactide (either L or D) was used as the cyclic diester of 2-hydroxyalkanoic acid. Tin octoate was used as the catalyst. Small amounts of alcohols were added to accelerate the reaction. The commercially available compound TMBH was used as a catalyst deactivating agent. No end-capping agent was used in this series of experiments.

In the execution of the experiments, the lactide was heated to 100-130 C and mixed with approximately 50 to 150 ppm Sn(oct)2. A small amount of alcohol (hexanol) of approximately 15-20 mmol per kg lactide was added as well. This mixture was entered at position 6 into polymerization apparatus 1 as shown in FIG. 1. The loop reactor and plug flow reactor conditions were optimized such that at position 7 the polymerization degree was at approximately 95%. In the first experiments (Trial 1), an amount of 0.15 [wt/wt %] of 1,1,3,3-tetramethylbutylhydroperoxide (TMBH) was added to the polymerization reaction mixture at position 7 and an additional 0.15% [wt/wt %] of 1,1,3,3-tetramethylbutylhydroperoxide (TMBH) was added also at position 8. In a second series of experiments (Trial 2), no TMBH was added to the polymerization reaction mixture at position 7 and 8, and instead only Succinic Anhydride (SA) was added in controlled amounts varying between 0.19 and 0.60 [wt/wt %]. In a third series of experiments, an anhydride was added to the polymerization reaction mixture at position 7 of the type and amount shown in Table 2 and TMBH was added at position 8.

Samples of the polymerization reaction mixture were collected at positions 8, 9, 10 and 12. From these samples, the lactide concentration was determined in the final polymer product, as well as the change in lactide between the positions 8 and 10.

In the first trial with only added catalyst deactivating agent, the lactide concentration increased between positions 8 and 10 but was then reduced after the second devolatilization in the final product at sampling point 12 on average to 1.5 wt/wt. It is noted that other trials based on only one single addition of peroxide-based compound gave even poorer results with regard to stability and achieving a low level of lactide in the final polymer product (not shown). In the second trial, the lactide concentration increased by about 2-3 wt % over the flow distance between positions 8 to 10 before decreasing to a final value of about 1.3 wt. % after the second devolatilization at position 12. From these observations, it is concluded that the melt stability towards formation of residual lactide is insufficient when either catalyst deactivating agent or end-capping agent alone are used alone. However in the third trial in which both catalyst deactivating agent and end-capping agent were added, the residual lactide content did not increase between positions 8 to 10, and it was able to be reduced further to a final value of about 0.2 wt % after the second devolatilisation step at position 12. This result then confirms the superiority of the process of the invention versus the processes of the prior art in preparing poly(2-hydroxyalkanoic acid) polymers having low levels of residual cyclic diester.

The positive effects of adding both a peroxide-based compound (TMBH) and an end-capping agent (acetic anhydride) in inhibiting reaction was further demonstrated by carrying out a fourth trial of model laboratory experiments. In these model experiments, lactide was equilibrated under inert atmosphere at 160° C. for 17 h in the presence of about 130-150 ppm Sn(oct)2 as catalyst and 120-160 mmol/kg hexanol as initiator. In one experiment, the peroxide TMBH was added alone, and in another experiment it was added together with acetic anhydride, and in a third experiment no peroxide or anhydride was added. As can be seen in Table 3 in FIG. 5, a very high conversion of about 96% was obtained when no peroxide or anhydride was added. When only peroxide was added, conversion was somewhat lower; however, when both peroxide and anhydride were added, the conversion was significantly lower than when no additives were added or only peroxide was added alone. These results confirm the effectiveness of using both a peroxide compound and end-capping agent in inhibiting reactivity in methods to produce poly(2-hydroxyalkanoic acid) polymers. Without wishing to be bound by any particular mechanism, the inventors believe this inhibition of reactivity is important in minimizing backbiting and accompanying formation of residual lactide, which then allows PLA polymers to be manufactured having improved lower levels of residual lactide.

While various embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

The invention claimed is:

1. A method for manufacturing poly(2-hydroxyalkanoic acid) having a Mn absolute ranging between 10000 and 250000 g/mol as determined by Gel Permeation Chromatography, the method comprising the steps of:
   mixing a cyclic diester of a 2-hydroxyalkanoic acid and a polymerization catalyst,
   polymerizing the cyclic diester to form poly(2-hydroxyalkanoic acid) in liquid phase,
   adding a peroxide-based compound as a catalyst deactivating agent to the liquid phase,
   applying a devolatilisation step to the liquid phase,
   adding an end-capping agent to the poly(2-hydroxyalkanoic acid) in the liquid phase, wherein the end-capping agent is an anhydride, and
   allowing the poly(2-hydroxyalkanoic acid) to solidify,
   thereby preparing a poly(2-hydroxyalkanoicacid) having a MN absolute ranging between 10000 and 250000 g/mol as determined by Gel Permeation Chromatography.

2. The method according to claim 1, wherein the poly(2-hydroxyalkanoic acid) is a poly(lactic acid).

3. The method according to claim 1, wherein the end-capping agent is an anhydride in the absence of a solvent.

4. The method according to claim 1, wherein the anhydride is one selected from the group consisting of phthalic anhydride, acetic anhydride, succinic anhydride and their mixtures.

5. The method according to claim 1, wherein the peroxide-based compound is an organic peroxide, organic hydroperoxides, or perester.

6. The method according to claim 5 wherein the peroxide-based compound is selected from 1,1,3,3-tetramethylbutyl-hydroperoxide, benzoyl peroxide, dilauroyl peroxide, tert-butylperoxy-diethylacetate, tert-butylperoxy-2-ethyl hexanoate, tert-butylperoxy-isobutyrate, tert-butylperoxy-acetate, tert-butylperoxy-benzoate, dibenzoyl peroxide, and their mixtures.

7. The method according to claim 1, wherein the cyclic diester is lactide, the polymerization catalyst is a tin-based catalyst.

8. The method according to claim 7, wherein the polymerization catalyst is tin(II) 2-ethylhexanoate.

9. The method according to claim 1, wherein an amount of the added end-capping agent to the poly(2-hydroxyalkanoic acid) in the liquid phase is in the range between 0.1 and 4 molar excess as compared to the amount of end groups of the poly(2-hydroxyalkanoic acid) in the liquid phase.

10. The method according to claim 1, wherein the end-capping agent and the catalyst deactivating agent are added to the poly(2-hydroxyalkanoic acid) in the liquid phase at different stages of the polymerization process.

11. The method according to claim 1, wherein the end-capping agent is added prior to the deactivating agent.

12. The method according to claim 11, wherein the end-capping agent is added prior to the devolatilization step.

13. The method according to claim 11, wherein the deactivating agent is added after the devolatilization step.

14. The method according to claim 1, wherein an additional devolatilization step is applied on the formed poly(2-hydroxyalkanoic acid) in the liquid phase after the addition of the deactivating agent.

15. A poly(2-hydroxyalkanoic acid) having a Mn absolute as determined by Gel Permeation Chromatography ranging between 10000 and 250000 g/mol, and wherein the polymer comprises a detectable residue of both an end-capping agent and a peroxide-based compound as a catalyst deactivating agent, wherein the end-capping agent is an anhydride.

16. The poly(2-hydroxyalkanoic acid) according to claim 15, in which the poly(2-hydroxyalkanoic acid) is a poly(lactic acid).

17. The poly(2-hydroxyalkanoic acid) according to claim 15, wherein a concentration of cyclic diester in the corresponding polymer is less than 0.5% by weight.

18. The poly(2-hydroxyalkanoic acid) according to claim 15, wherein a portion of the end groups are derived from an anhydride.

19. The poly(2-hydroxyalkanoic acid) according to claim 15, wherein a portion of the end groups are carboxylic acid end groups.

20. The poly(2-hydroxyalkanoic acid) according to claim 19, wherein the carboxylic acid end groups comprise —O—(C=O)R(C=O)—OH, wherein R is a C1 to C8 alkyl.

21. The poly(2-hydroxyalkanoic acid) according to claim 15, containing a residue of a tin-based catalyst and a residue of 1,1,3,3-tetramethylbutylhydroperoxide.

* * * * *